United States Patent
Yi et al.

(10) Patent No.: US 12,422,101 B2
(45) Date of Patent: Sep. 23, 2025

(54) SYSTEM AND METHOD FOR CONTROLLING BOIL-OFF GAS FROM LIQUEFIED HYDROGEN

(71) Applicant: KOREA GAS CORPORATION, Daegu (KR)

(72) Inventors: Jong Yeol Yi, Daegu (KR); Yong Seong Jeon, Daegu (KR); Jae Hyun Ma, Daegu (KR); Ji Hoon Joung, Daegu (KR); Hae Chul Han, Daegu (KR); Eun Young Yun, Daegu (KR); Jin Yeong Park, Daegu (KR)

(73) Assignee: KOREA GAS CORPORATION, Daegu (KR)

( * ) Notice: Subject to any disclaimer, the term of this patent is extended or adjusted under 35 U.S.C. 154(b) by 0 days.

(21) Appl. No.: 18/003,568

(22) PCT Filed: Jul. 7, 2022

(86) PCT No.: PCT/KR2022/009822
§ 371 (c)(1),
(2) Date: Dec. 28, 2022

(87) PCT Pub. No.: WO2024/010114
PCT Pub. Date: Jan. 11, 2024

(65) Prior Publication Data
US 2024/0247759 A1    Jul. 25, 2024

(30) Foreign Application Priority Data
Jul. 5, 2022    (KR) .................. 10-2022-0082529

(51) Int. Cl.
*F17C 9/04*    (2006.01)
(52) U.S. Cl.
CPC ........ *F17C 9/04* (2013.01); *F17C 2201/0114* (2013.01); *F17C 2221/012* (2013.01);
(Continued)

(58) Field of Classification Search
CPC ............... F17C 9/04; F17C 2201/0114; F17C 2221/012; F17C 2223/0161;
(Continued)

(56) References Cited

U.S. PATENT DOCUMENTS 5,154,062 A * 10/1992 Gaumer, Jr. ............. F25J 1/001
62/54.1
5,168,710 A * 12/1992 Miyazaki ............... F25J 1/0251
62/54.1
(Continued)

FOREIGN PATENT DOCUMENTS

EP        4108975 B1 *  2/2025    ............... F17C 3/02
JP        S57-061899 A   4/1982
(Continued)

OTHER PUBLICATIONS

Search Report dated Mar. 30, 2023 in International Application No. PCT/KR2022/009822.
(Continued)

*Primary Examiner* — Jianying C Atkisson
*Assistant Examiner* — Ibrahim A. Michael Adeniji
(74) *Attorney, Agent, or Firm* — Knobbe, Martens, Olson & Bear, LLP

(57) ABSTRACT

Disclosed herein are a system and method which can control the generation rate of boil-off gas from liquefied hydrogen and can maintain the liquefied hydrogen storage tank at a low pressure. The method for controlling boil-off gas from liquefied hydrogen according to the present invention includes: at least two storage tanks storing liquefied hydrogen and each operated in a high-temperature mode or in a low-temperature mode, wherein the low-temperature mode includes: maintaining at least a portion of liquefied hydrogen stored in the storage tank at a first temperature being a densification temperature, and the high-temperature mode
(Continued)

includes: maintaining at least a portion of liquefied hydrogen stored in the storage tank at a second temperature being a temperature exceeding a triple point of liquefied hydrogen through recovery of cold heat from liquefied hydrogen stored in the storage tank.

9 Claims, 2 Drawing Sheets

(52) U.S. Cl.
CPC ............ *F17C 2223/0161* (2013.01); *F17C 2227/0157* (2013.01); *F17C 2227/0323* (2013.01); *F17C 2227/0365* (2013.01); *F17C 2265/033* (2013.01)

(58) Field of Classification Search
CPC ...... F17C 2227/0157; F17C 2227/0323; F17C 2227/0365; F17C 2265/033; F17C 3/02; F17C 13/00; F17C 13/02; Y02E 60/32
See application file for complete search history.

(56) References Cited

U.S. PATENT DOCUMENTS

| | | | | |
|---|---|---|---|---|
| 2004/0060303 A1* | 4/2004 | Haberbusch | ............. | F17C 5/04 62/6 |
| 2004/0093874 A1* | 5/2004 | Bradley | ............... | F17C 11/005 705/413 |
| 2005/0284154 A1* | 12/2005 | Peter | ......................... | F17C 3/08 62/53.2 |
| 2009/0185972 A1* | 7/2009 | Lee | ....................... | F17C 11/005 423/658.2 |
| 2009/0199574 A1* | 8/2009 | Hirose | .................. | F17C 11/005 62/50.7 |
| 2024/0191841 A1* | 6/2024 | You | ........................ | B01J 23/745 |

FOREIGN PATENT DOCUMENTS

| | | |
|---|---|---|
| JP | 2004-197705 A | 7/2004 |
| JP | 2006-153208 A | 6/2006 |
| JP | 2007-162849 A | 6/2007 |
| JP | 2012-526957 A | 11/2012 |
| JP | 2014-081007 A | 5/2014 |
| JP | 2019-506571 A | 3/2019 |
| JP | 2020-091016 A | 6/2020 |
| JP | 2021-507178 A | 2/2021 |
| KR | 10-2004-0050763 A | 6/2004 |
| KR | 10-2018-0036699 | 4/2018 |
| KR | 10-2019-0117132 | 10/2019 |
| KR | 10-2302059 B1 | 9/2021 |

OTHER PUBLICATIONS

Office Action in Japanese Patent Application No. 2022-575462, dated Aug. 1, 2024.
Office Action received in Japanese Patent Application No. 2022-575462 dated Feb. 18, 2025.

* cited by examiner

SYSTEM AND METHOD FOR CONTROLLING BOIL-OFF GAS FROM LIQUEFIED HYDROGEN

TECHNICAL FIELD

The present invention relates to a liquefied hydrogen storage tank applicable to a storage facility storing a large amount of hydrogen in a liquefied state or a vehicle transporting liquefied hydrogen and, more particularly, to a system and method for controlling boil-off gas from liquefied hydrogen that can control the generation rate of boil-off gas from liquefied hydrogen and can maintain a liquefied hydrogen storage tank at a low pressure.

BACKGROUND ART

Hydrogen transportation is broadly classified into inland transportation and marine transportation. Inland transportation includes transportation by pipelines, dedicated vehicles with a storage container, or railroads, and marine transportation includes transportation by floating structures such as a ship with a storage facility.

Until recently, hydrogen has been transported and supplied on a small scale after being compressed to a pressure of 200 bar or more and stored in a special container. However, as use of eco-friendly energy becomes more important due to carbon taxes and the like, technology for large-scale long-distance transport is needed. In particular, for efficient transportation of hydrogen, it is necessary to consider storing and transporting hydrogen in a liquid state by liquefying gaseous hydrogen through cooling and compression.

Liquid hydrogen is obtained by cooling gaseous hydrogen to a cryogenic temperature (about $-253°$ ° C. based on atmospheric pressure), and may be stored in a special insulated storage tank for cryogenic fluids to be maintained in a liquid state during transportation.

Liquefied hydrogen has a volume of about 1/865 that of hydrogen in a gaseous state, and thus has a volumetric energy density 865 times that of gaseous hydrogen for a given pressure. As such, storing hydrogen in a liquid state allows high-density storage, as compared with storing gaseous hydrogen at high pressure, and is advantageous in terms of safety of a storage tank, reduction in storage costs, and reduction in risk of explosion.

Existing liquefied gas storage technologies are targeted at liquefied natural gas (LNG) or liquefied petroleum gas (LPG). Since the liquefaction temperature (or boiling point) of hydrogen is much lower than the liquefaction temperature of natural gas (about $-163°$ C. based on atmospheric pressure), the storage pressure of liquefied hydrogen is much higher than that of LNG. Accordingly, in order to apply such typical storage technologies to hydrogen, it is necessary to increase insulation thickness by several times to dozens of times.

In addition, when liquefied hydrogen is stored using thermal insulation technology available for storage of LNG, the design pressure of a storage tank needs to be set to a high pressure of 3 bar or more based on the triple point of hydrogen. In other words, due to the high storage pressure of liquefied hydrogen, the inner wall thickness of the storage tank inevitably increases to a level exceeding construction and inspection standards.

Accordingly, in storing and transporting a large amount of liquefied hydrogen, it is very important to reduce the storage pressure and improve the level of thermal insulation and energy efficiency provided by the existing liquefied gas storage technologies.

Meanwhile, treatment of boil-off gas is essential in storing and transporting liquefied gas. Accordingly, various methods for treatment of boil-off gas from LNG have been proposed and are being put to practical use.

LNG is maintained in a stable state at a pressure of about 0.36 bar and a temperature of about $-163°$ C., whereas liquefied hydrogen is stored at a temperature of $-253°$ ° C., which is about 90 degrees lower than the storage temperature of LNG, and a pressure of 2 bar to 6 bar, which is several times the storage pressure of LNG, that is, 0.36 bar. In addition, since liquefied hydrogen has the property that boil-off gas is irregularly generated due to ortho-para conversion, there is a limitation in applying technology for treatment of boil-off gas from LNG to treatment of liquefied hydrogen.

DISCLOSURE

[Technical Tasks]

Embodiments of the present invention are conceived to solve such problems in the art and it is one object of the present invention to provide a boil-off gas control system and method which can control the generation rate of liquefied hydrogen boil-off gas during storage and transport of liquefied hydrogen.

It is a further object of the present invention to provide a system and method for controlling boil-off gas from liquefied hydrogen which can maintain a liquefied hydrogen storage tank at a low pressure through control over the generation rate of boil-off gas, which tends to be generated irregularly due to ortho-para conversion of hydrogen, thereby allowing increase in capacity of the liquefied hydrogen storage tank.

It will be understood that technical problems to be solved by the present invention and objects of the present invention are not limited to the above. Other technical problems to be solved by the present invention and other objects of the present invention will become apparent to those skilled in the art from the detailed description of the following embodiments in conjunction with the accompanying drawings.

Technical Solution

In accordance with one aspect of the present invention, a method for controlling boil-off gas from liquefied hydrogen includes: at least two storage tanks storing liquefied hydrogen and each operated in a high-temperature mode or in a low-temperature mode, and wherein the low-temperature mode includes maintaining at least a portion of liquefied hydrogen stored in the storage tank at a first temperature being a densification temperature, and the high-temperature mode includes maintaining at least a portion of liquefied hydrogen stored in the storage tank at a second temperature being a temperature exceeding a triple point of liquefied hydrogen through recovery of cold heat from liquefied hydrogen stored in the storage tank.

In the step of maintaining at least a portion of liquefied hydrogen stored in the storage tank at the second temperature, boil-off gas is generated, and the high-temperature mode further includes: interrupting successive evaporation by depressurizing an inside of the storage tank to a vacuum;

and discharging the generated boil-off gas from the storage tank such that the generated boil-off gas is used to produce electric power.

The cold heat recovered from liquefied hydrogen in the high-temperature mode is used in the step of maintaining at least a portion of liquefied hydrogen stored in the storage tank at the first temperature.

The step of maintaining at least a portion of liquefied hydrogen stored in the storage tank at the first temperature includes: solidifying at least a portion of liquefied hydrogen stored in a storage tank operated in the low-temperature mode, such that hydrogen stored in the storage tank operated in the low-temperature mode is present in a solid state and a liquid state.

In accordance with another aspect of the present invention, a system for controlling boil-off gas from liquefied hydrogen include at least two storage tanks storing liquefied hydrogen, and wherein each of the at least two storage tanks is provided therein with a densification unit maintaining liquefied hydrogen stored in the storage tank at a first temperature; and a temperature maintenance unit maintaining liquefied hydrogen stored in the storage tank at a second temperature, and the at least two storage tanks include a low-temperature tank in which at least a portion of liquefied hydrogen stored therein is maintained at the first temperature being a densification temperature by the densification unit; and a high-temperature tank in which at least a portion of liquefied hydrogen stored therein is maintained at the second temperature being a temperature exceeding a triple point of liquefied hydrogen by the temperature maintenance unit.

The system may further include a compressor discharging boil-off gas from each of the at least two storage tanks and depressurizing an inside of the storage tank to a vacuum; a buffer tank storing boil-off gas compressed by the compressor; and an energy conversion unit producing electric power using the boil-off gas stored in the buffer tank.

The system may further include a heat transfer medium circulation unit receiving a low-temperature heat transfer medium having recovered cold heat from liquefied hydrogen in the temperature maintenance unit of the high-temperature tank and supplying the low-temperature heat transfer medium to the temperature maintenance unit of the low-temperature tank, and the heat transfer medium circulation unit is driven by electric power produced by the energy conversion unit.

The system may further include a heat transfer medium circulation unit supplying a low-temperature heat transfer medium to the temperature maintenance unit of each of the at least two storage tanks, and the densification unit solidifies at least a portion of liquefied hydrogen stored in the storage tank by primarily recovering cold heat from the low-temperature heat transfer medium supplied to the temperature maintenance unit.

Advantageous Effects

The system and method according to the present invention can maintain the storage pressure of liquefied hydrogen at atmospheric pressure levels by cooling the inside of a storage tank and solidifying a portion of liquefied hydrogen stored in the storage tank to allow liquefied hydrogen to be stored in a stable state in the storage tank.

In addition, in the system and method according to the present invention, cryogenic heat and latent heat of evaporation can be further obtained from hydrogen in a liquid state by solidifying a portion of liquefied hydrogen.

In addition, due to reduction in storage pressure of liquefied hydrogen, it is possible to reduce the thickness of an inner wall of a liquefied hydrogen storage tank, thereby allowing increase in size of the liquefied hydrogen storage tank.

Typically, a liquefied hydrogen storage tank is connected to a fuel cell to use boil-off gas from liquefied hydrogen as fuel for the fuel cell. However, there is a problem that the generation rate of boil-off gas varies over time and depending on the external temperature. According to the present invention, the generation of boil-off gas, which tends to be generated irregularly, can be controlled to a constant level through control over the internal temperature of a liquefied hydrogen storage tank, thereby allowing stable supply of hydrogen fuel to a fuel cell and thus stable production and supply of electric power.

Upon transportation of cryogenic liquefied gas by sea, sloshing may occur in a storage tank during high wave conditions, causing damage to the storage tank. According to the present invention, a portion of liquefied hydrogen stored in the storage tank is phase-changed into a solid, which has higher viscosity, thereby suppressing sloshing in the storage tank and ensuring transportation safety.

According to the present invention, cold heat recovered from liquefied hydrogen is transferred between a low-temperature tank and a high-temperature tank to be used to control the generation of boil-off gas, thereby allowing stable production of electric power, which, in turn, is utilized to cool liquefied hydrogen. In this way, efficiency of the overall control process can be increased, thereby allowing liquefied hydrogen to be maintained and stored in a cryogenic liquid state for a long time.

In addition, according to the present invention, high energy-efficiency boil-off gas control technology can be applied during storage and transportation of liquefied hydrogen as well as to a liquefied hydrogen terminal where unloading of liquefied hydrogen is performed, such as a liquefied hydrogen supply station and a liquefied hydrogen receiving station.

EMBODIMENTS

Figure 1:
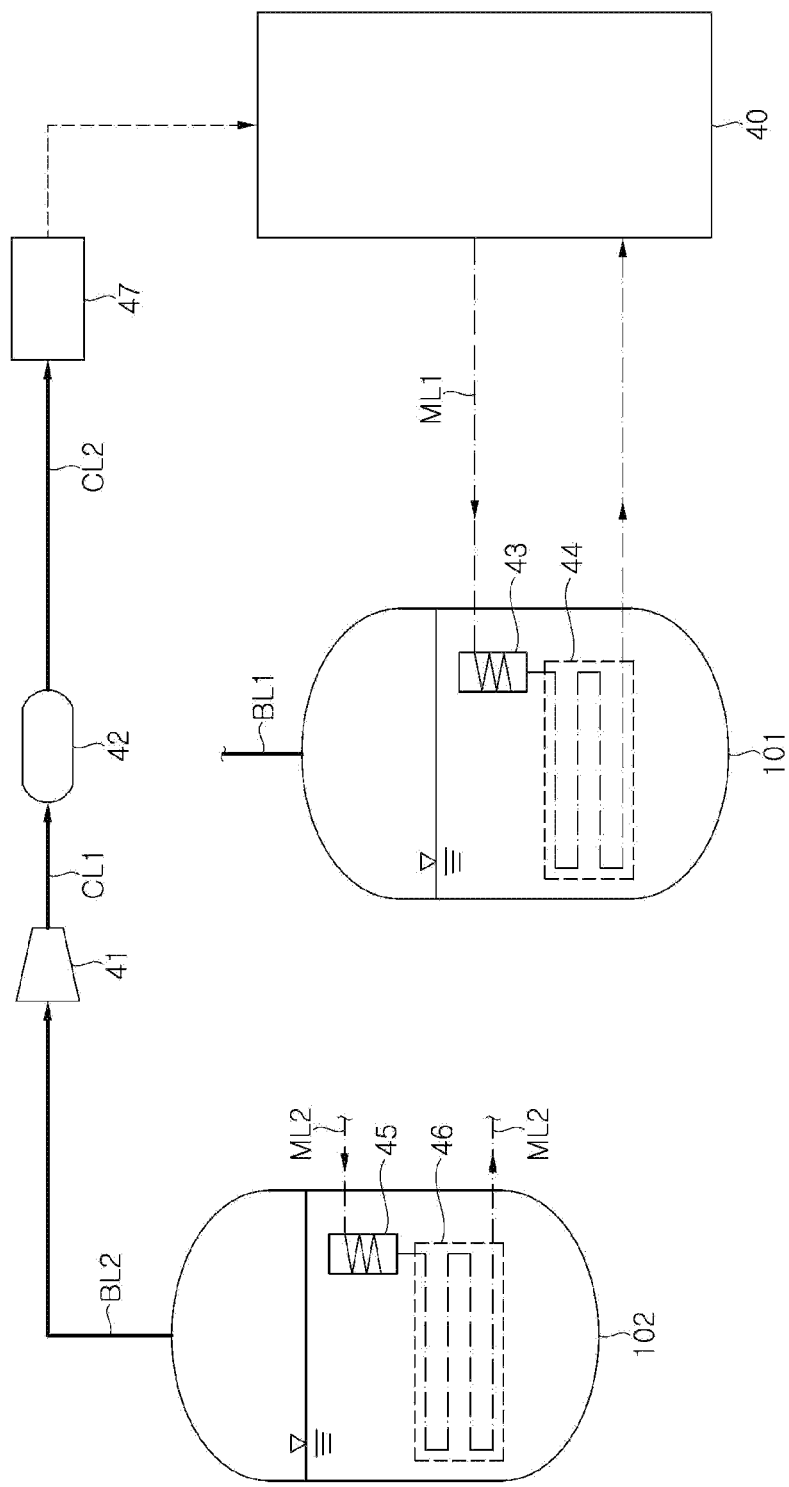
FIG. 1 is a schematic diagram of a system for controlling boil-off gas from liquefied hydrogen according to a first embodiment of the present invention.

The above and other aspects, features, and advantages of the present invention will become apparent from the detailed description of the following embodiments in conjunction with the accompanying drawings.

Hereinafter, embodiments of the present invention will be described with reference to the accompanying drawings. It should be noted that like components will be denoted by like reference numerals throughout the specification and the accompanying drawings. In addition, it should be understood that the present invention may be embodied in different ways and is not limited to the following embodiments.

A system and method for controlling boil-off gas from liquefied hydrogen according to embodiments of the present invention described below may be applied to both onshore and offshore storage facilities and vehicles.

In the following description, it is assumed that embodiments of the present invention are used in offshore applications and a vehicle provided with a liquefied hydrogen storage tank is a ship.

The ship to which embodiments of the present invention are applied is a ship provided with a liquefied hydrogen storage facility, and may include self-propelled vessels, such as a liquefied hydrogen carrier, and non-self-propelled floating offshore structures, such as a floating production storage offloading (FPSO) and a floating storage regasification unit (FSRU). However, in embodiments described below, it is assumed that the ship is a liquefied hydrogen carrier.

Hereinafter, a system and method for controlling boil-off gas from liquefied hydrogen according to embodiments of the present invention will be described with reference to FIG. 1 and FIG. 2.

First, a system and method for controlling boil-off gas from liquefied hydrogen in a liquefied hydrogen storage tank according to a first embodiment of the present invention will be described with reference to FIG. 1.

The system for controlling boil-off gas from liquefied hydrogen according to this embodiment includes multiple storage tanks 101, 102 storing liquefied hydrogen, a compressor discharging boil-off gas from the storage tank 101; 102, a buffer tank 42 storing boil-off gas discharged from the storage tank 101; 102, an energy conversion unit 47 producing electric power using boil-off gas discharged from the storage tank 101; 102, and a heat transfer medium circulation unit 40 recovering thermal energy from liquefied hydrogen.

The storage tanks 101, 102 according to this embodiment are a large-capacity storage tank having a volume of 100 m$^3$ or more.

The storage tanks 101, 102 according to this embodiment may be operated at a pressure of 0.1 bar to 6 bar, preferably a pressure of 3 bar or less, more preferably a pressure of 1 bar or less or atmospheric pressure.

The storage tanks 101, 102 according to this embodiment may be operated in either a low-temperature mode in which the storage tank is maintained at a first temperature or a high-temperature mode in which the storage tank is maintained at a second temperature higher than the first temperature. In the following description of this embodiment, a storage tank operated in the low-temperature mode will be referred to as a low-temperature tank 101 and a storage tank operated in the high-temperature mode will be referred to as a high-temperature tank 102.

In this embodiment, the first temperature is a densification temperature that causes increase in density of liquefied hydrogen stored in the storage tank. Herein, the densification temperature refers to a temperature at which liquefied hydrogen is present in a solid-liquid mixed state, and may range from about 14 K to 21 K.

In this embodiment, when the storage tanks 101, 102 are operated in the low-temperature mode, liquefied hydrogen stored in the storage tanks 101, 102 is maintained at the densification temperature. At the densification temperature, at least a portion of the liquefied hydrogen is present in a solid state, which is denser than a liquid state, and thus the liquefied hydrogen is present in the solid-liquid mixed state, preferably in the form of a slurry.

Density of liquefied hydrogen changes by about 1 kg/m$^3$ in response to a temperature change of 1 K, and liquefied hydrogen has a density of about 77 kg/m$^3$ at a temperature of 14 K and a density of 77 kg/m$^3$ at a temperature of 21 K.

In this embodiment, the second temperature may be a triple point of liquefied hydrogen, and may be, for example, a temperature exceeding 21 K. When the storage tank is maintained at the second temperature, liquefied hydrogen stored in the storage tank may be maintained at a temperature of about 21 K, specifically a temperature slightly higher than 21 K.

In this embodiment, when the system includes two storage tanks 101, 102, one of the two storage tanks 101, 102 is operated as the low-temperature tank 101 and the other one is operated as the high-temperature tank 102, wherein the low-temperature tank 101 operated in the low-temperature mode and the high-temperature tank 102 operated in the high-temperature mode may change operation modes thereof during use.

That is, the low-temperature tank 101 operated in the low-temperature mode may be operated as the high-temperature tank 102 upon completion of the low-temperature mode and the high-temperature tank 102 operated in the high-temperature mode may be operated as the low-temperature tank 101 upon completion of the high-temperature mode.

Among the multiple storage tanks 101, 102, the number of storage tanks to be operated in the low-temperature mode and the number of storage tanks to be operated in the high-temperature mode may be adjusted depending on the operating condition of the ship.

For example, when the ship is carrying liquefied hydrogen by sea, all the multiple storage tanks 101, 102 are operated in the low-temperature mode.

In addition, when the system is applied to a liquefied hydrogen storage station, the multiple storage tanks may be operated in a mixed operation mode in which at least one storage tank is operated in the low-temperature mode and at least one storage tank is operated in the high-temperature mode. Since the liquefied hydrogen storage station is required to use boil-off hydrogen gas (or evaporated hydrogen gas) as fuel for producing electric power to be used in the system, at least one storage tank is operated in the high-temperature mode to continuously generate a certain amount of boil-off hydrogen gas to stably produce and supply electric power.

Herein, the liquefied hydrogen storage station refers to an onshore or offshore station that has multiple liquefied hydrogen storage tanks, stores a large amount of liquefied hydrogen in the liquefied hydrogen storage tanks, and supplies (unloads) liquefied hydrogen to a vehicle or a demand site.

Upon unloading liquefied hydrogen from the liquefied hydrogen storage station to a vehicle or a demand site, liquefied hydrogen is supplied from the multiple liquefied hydrogen storage tanks sequentially or simultaneously. Here, the multiple liquefied hydrogen storage tanks may be operated in a mixed operation mode, that is, in a mode in which at least one liquefied hydrogen storage tank is operated in the high-temperature mode and at least one liquefied hydrogen storage tank is operated in the low-temperature mode. Here, the last liquefied hydrogen storage tank to supply liquefied hydrogen may be operated in the high-temperature mode.

According to this embodiment, the storage tanks 101, 102 may be maintained at a pressure of 3 bar or less, a pressure of 1 bar or less, or atmospheric pressure, regardless of whether the storage tank is operated in the low-temperature mode or in the high-temperature mode.

Although the compressor 41, the buffer tank 42, and the energy conversion unit 47 are shown as being connected only to the high-temperature tank 102 in FIG. 1, it should be understood that the present invention is not limited thereto and the compressor 41, the buffer tank 42, and the energy conversion unit 47 may also be connected to the low-temperature tank 101. Alternatively, a separate compressor, a separate buffer tank, and a separate energy conversion unit may be connected to the low-temperature tank 101.

In this embodiment, it is assumed that the low-temperature tank 101 and the high-temperature tank 102 share the compressor 41, the buffer tank 42, and the energy conversion unit 47 with one another. The low-temperature tank 101 and the compressor 41 are connected to each other via a first boil-off gas supply line BL1, and the high-temperature tank 102 and the compressor 41 are connected to each other via a second boil-off gas supply line BL2.

In this embodiment, each of the storage tanks 101, 102 is provided therein with a temperature maintenance unit 44; 46 that is a flow path through which a hot or low-temperature heat transfer medium transferred from the heat transfer medium circulation unit 40 flows to maintain the inside of the storage tank 101 or 102 at the operating temperature thereof; and a densification unit 43; 45 disposed above the temperature maintenance unit 44; 46 and allowing a low-temperature heat transfer medium transferred from the heat transfer medium circulation unit 40 to flow therethrough to increase density of liquefied hydrogen in the storage tank 101 Or 102.

Although the densification unit 43; 45 is described as being disposed above the temperature maintenance unit 44; 46 in this embodiment as shown in FIG. 1, it should be understood that the present invention is not limited thereto and the densification unit 43; 45 may be disposed at any suitable location, including a location parallel to the temperature maintenance unit 44; 46.

In the following description of this embodiment, the densification unit of the low-temperature tank 101 will be referred to as a first densification unit 43, the temperature maintenance unit of the low-temperature tank 101 will be referred to as a first temperature maintenance unit 44, the densification unit of the high-temperature tank 102 will be referred to as a second densification unit 45, and the temperature maintenance unit of the high-temperature tank 102 will be referred to as a second temperature maintenance unit 46.

The first densification unit 43, the first temperature maintenance unit 44, and the heat transfer medium circulation unit 40 are connected to one another via a first heat transfer medium line ML1, and the second densification unit 45, the second temperature maintenance unit 46, and the heat transfer medium circulation unit 40 are connected to one another via a second heat transfer medium line ML2.

The low-temperature tank 101 operated in the low-temperature mode may be maintained at the first temperature, that is, the densification temperature in the range of 13 K to 21 K, 20 K or less, or 13 K to 14 K, by a low-temperature heat transfer medium received through the first heat transfer medium line ML1.

Hydrogen in the low-temperature tank 101 operated in the low-temperature mode may be present in a liquid state, a liquid-solid two-phase mixed state, or a liquid-solid-gas three-phase mixed state.

The high-temperature tank 102 operated in the high-temperature mode may be maintained at a temperature slightly higher than the triple point of hydrogen, for example, at an operating temperature of about 21 K, by a high-temperature heat transfer medium received through the second heat transfer medium line ML2.

Hydrogen in the high-temperature tank 102 operated in high-temperature mode may be present in a liquid state, a gaseous state, or a liquid-gas two-phase mixed state.

The heat transfer medium circulation unit 40 according to this embodiment supplies a high-temperature heat transfer medium to the high-temperature tank 102 and receives a low-temperature heat transfer medium having recovered cold heat from liquid hydrogen from the high-temperature tank 102.

In addition, the heat transfer medium circulation unit 40 supplies the low-temperature heat transfer medium to the low-temperature tank 101 and receives a high-temperature heat transfer medium having transferred cold heat to hydrogen stored in the low-temperature tank 102.

The heat transfer medium circulation unit 40 according to this embodiment may employ a refrigeration cycle using helium as a refrigerant.

A fluid transferred through the heat transfer medium lines ML1, ML2 may be helium or an intermediate heat transfer medium that mediates transfer of thermal energy between helium and hydrogen stored in the storage tanks 101, 102.

In this embodiment, the low-temperature mode is performed to suppress reactivity of liquefied hydrogen stored in the storage tank to allow hydrogen to be stored in a stable liquid state.

In this embodiment, the high-temperature mode is performed to induce generation of a certain amount of boil-off gas through vaporization of a portion of liquefied hydrogen stored in the storage tank to supply the generated boil-off gas as fuel for production of electric power in the energy conversion unit 47. In addition, cold heat to be supplied to liquefied hydrogen in the low-temperature tank 101 operated in the low-temperature mode may be recovered from liquefied hydrogen in the high-temperature tank 102 operated in the high-temperature mode.

In this embodiment, the densification unit 43; 45 is activated in a low-temperature mode and the temperature maintenance unit 44; 46 is activated in a high-temperature mode. The temperature maintenance unit 44; 46 may also be activated in a low-temperature mode, as needed.

That is, when the densification unit 43; 45 is activated, liquefied hydrogen around the densification unit 43, 45 is maintained at the first temperature and, when the temperature maintenance unit 44; 46 is activated, liquefied hydrogen around the temperature maintenance unit 44; 46 is maintained at the second temperature.

In the low-temperature mode according to this embodiment, a low-temperature heat transfer medium may be supplied from the heat transfer medium circulation unit 40 to the first densification unit 43 of the low-temperature tank 101 through the first heat transfer medium line ML1 and a medium-temperature heat transfer medium, cold heat of which has been primarily recovered by the first densification unit 43, may be transferred to the first temperature maintenance unit 44.

The first densification unit 43 suppresses reactivity of liquefied hydrogen in the low-temperature storage tank by cooling and solidifying a portion of the liquefied hydrogen. As a portion of the liquefied hydrogen begins to solidify, ortho-para conversion of the liquefied hydrogen is suppressed, thereby preventing liquid-to-gas phase change and further evaporation of the liquefied hydrogen and thus maintaining the liquefied hydrogen in a stable state. A portion of liquefied hydrogen stored in the low-temperature tank 101, for example, a surface layer of the liquefied hydrogen, may be present in a slurry state by the first densification unit 43A.

The first densification unit 43 solidifies a portion of liquefied hydrogen stored in the low-temperature tank 101, specifically, liquefied hydrogen around the location of the first densification unit 43. In this embodiment, the first densification unit 43 may be selectively activated when reactivity of liquefied hydrogen stored in the low-temperature tank 101 increases above a reference level or at a temperature lower than or equal to a specific temperature.

According to this embodiment, stable storage of hydrogen can be achieved by solidifying a portion of liquefied hydrogen stored in the large-capacity storage tanks 101, 102, rather than the entirety of the stored liquefied hydrogen, using the densification unit 43; 45 disposed inside the storage tank as a solidification device inducing liquid-to-solid phase change of liquefied hydrogen, such that a portion of hydrogen in the storage tank is present in a solid state retaining a larger amount of cold heat, thereby maximizing retention of latent heat in the hydrogen.

The first temperature maintenance unit 44 allows a portion of liquefied hydrogen stored in the low-temperature tank 101, for example, liquefied hydrogen around the location of the first temperature maintenance unit 44, to be maintained at a temperature of 20 K or less.

A high-temperature heat transfer medium having been heated while cooling liquefied hydrogen in the first temperature maintenance unit 44 is returned to the heat transfer medium circulation unit 40 through the first heat transfer medium line ML1.

In this embodiment, the inside of the low-temperature tank 101 operated in the low-temperature mode is maintained at a temperature of 20 K or less, such that at least a portion of the liquefied hydrogen stored in the low-temperature tank 101 is present in a solid state and acts as a barrier suppressing evaporation of liquefied hydrogen. In this way, the inside of the low-temperature tank 101 can be maintained at a pressure of 1 bar or less.

In the high-temperature mode according to this embodiment, a high-temperature heat transfer medium is supplied from the heat transfer medium circulation unit 40 to the second temperature maintenance unit 46 of the high-temperature tank 102 through the second heat transfer medium line ML2.

The second temperature maintenance unit 46 allows the inside of the high-temperature tank 102 to be maintained at a temperature exceeding the triple-point temperature of hydrogen, that is, a temperature of 21 K or higher. As the high-temperature heat transfer medium is supplied to the high-temperature tank 102, liquefied hydrogen in the high-temperature tank 102 begins to evaporate.

A low-temperature heat transfer medium having been cooled while recovering cold heat from liquefied hydrogen in the second temperature maintenance unit 46 is returned to the heat transfer medium circulation unit 40 through the second heat transfer medium line ML2.

Hydrogen molecules can be classified into ortho-hydrogen and para-hydrogen based on the spin direction of the nuclei of two individual atoms thereof. An abundance ratio of ortho-hydrogen to para-hydrogen is temperature-dependent. Under room temperature and atmospheric pressure conditions, hydrogen is present in a gaseous state and the abundance ratio of ortho-hydrogen to para-hydrogen is 3:1. At a temperature as low as 20 K, hydrogen is present in a liquid state and the percentage of para-hydrogen reaches 99.8%, which overwhelmingly outnumbers the percentage of ortho-hydrogen.

A hydrogen molecule has the property of evaporating by itself upon temperature drop since one of the nuclei of two individual atoms thereof spinning in the same direction spins in the reverse direction and heat is thus generated due to spin of the nuclei in opposite directions. That is, when hydrogen is stored for a long time, conversion of ortho-hydrogen into para-hydrogen naturally occurs, causing generation of heat.

Heat generated by ortho-para conversion of hydrogen is greater than latent heat of evaporation for liquefied hydrogen, causing evaporation of liquefied hydrogen stored in the storage tank.

Due to this property of hydrogen, boil-off hydrogen gas is generated irregularly. For example, the generation rate of boil-off hydrogen gas increases for a moment and then drastically decreases due to interruption of evaporation of liquefied hydrogen. According to this embodiment, the generation rate of boil-off gas can be controlled to a constant level by operating the storage tanks in the high-temperature mode and the low-temperature mode.

In this embodiment, when it is time to discharge boil-off gas from the storage tanks 101, 102, the compressor 41 is activated to discharge boil-off gas from the storage tanks 101, 102.

The compressor 41 according to this embodiment compresses boil-off gas in the storage tanks 101, 102 and discharges the compressed boil-off gas from the storage tanks 101, 102. Particularly, when boil-off gas generated in the storage tanks 101, 102 explodes, the compressor 41 is operable for instantly discharging the boil-off gas to evacuate the storage tanks 101, 102 to a medium vacuum.

The compressor 41 is used as a means for discharging boil-off gas when the storage tanks 101, 102 are operated in the low-temperature mode and is used as a means for evacuating the storage tanks 101, 102 to a medium vacuum when the storage tanks 101, 102 are operated in the high-temperature mode.

When the storage tanks 101, 102 are evacuated to a medium vacuum by activation of the compressor 41, ortho-para conversion occurs in the storage tanks 101, 102, increasing the percentage of para-hydrogen. Then, the compressor is deactivated to release the vacuum from the storage tanks 101, 102, thereby stabilizing the storage tanks 101, 102.

The compressor 41 according to this embodiment is a compressor capable of evacuating a large-capacity liquefied hydrogen storage tank having a volume of 100 m$^3$. The compressor 41 may be a multistage compressor including multiple compressors connected in series, or may include multiple compressors connected in parallel, depending on the operating range thereof.

Boil-off gas discharged from the storage tanks 101, 102 through the second boil-off gas supply line BL2 by activation of the compressor 41 may be transferred to and stored in the buffer tank 42 through a first boil-off gas distribution line CL1.

In addition, the boil-off gas discharged from the storage tanks 101, 102 may be transferred to the energy conversion unit 47 through a second boil-off gas distribution line CL2.

In this embodiment, the energy conversion unit 47 may include at least one selected from among a fuel cell that produces electric power by electrochemical reaction using hydrogen as a fuel and a turbine generator that produces electric power through conversion of mechanical energy of a turbine driven using hydrogen gas as a working fluid.

Electric power produced by the energy conversion unit 47 according to this embodiment may be used by the heat transfer medium circulation unit 40, and may be distributed to on-board power demand sites by a power distribution unit (not shown), such as a switch board.

Gaseous nitrogen or methane is cooled to a liquid state when compressed and subjected to Joule-Thomson expansion. Conversely, gaseous hydrogen or helium, which has an inversion temperature lower than room temperature, becomes warm when subjected to Joule-Thomson expansion at room temperature. Accordingly, hydrogen needs to be subjected to expansion at a temperature lower than the inversion temperature thereof to be cooled.

In this embodiment, the internal pressure of the high-temperature tank 102 operated in the high-temperature mode and the generation rate of boil-off gas in the high-temperature tank 102 can be controlled by maintaining the inside of the high-temperature tank 102 at a temperature higher than 20 K and lower than the inversion temperature of hydrogen and evacuating the high-temperature tank 102 to promote ortho-para conversion and to instantly discharge boil-off gas. In this way, the inside of the high-temperature tank 102 may be maintained at a pressure of 3 bar or less.

Next, a system and method for controlling boil-off gas from liquefied hydrogen according to a second embodiment of the present invention will be described with reference to FIG. 2.

This embodiment is a modification of the first embodiment described above, and relates to a system and method that can control boil-off gas from liquefied hydrogen while supplying liquefied hydrogen to a demand site in an unloading mode in which liquefied hydrogen is unloaded between a liquefied hydrogen storage tank and a vehicle (demand site 51, 52) to which the system and method for controlling boil-off gas from liquefied hydrogen according to the first embodiment are applied.

Accordingly, this embodiment relates to a liquefied hydrogen supply system and method that can supply liquefied hydrogen by operating the liquefied hydrogen storage tanks according to the first embodiment and a storage facility or vehicle to which the first embodiment is applied in an unloading mode in which liquefied hydrogen is unloaded from the liquefied hydrogen storage tanks to liquefied hydrogen demand sites.

According to this embodiment, the multiple liquefied hydrogen storage tanks 101, 102 are operated in an alternating mode. In addition, according to this embodiment, the multiple liquefied hydrogen storage tanks 101, 102 include at least one low-temperature tank 101 and at least one high-temperature tank 102. However, the last liquefied hydrogen storage tank to perform unloading may be operated as the high-temperature tank 102.

According to this embodiment, in the above-described first embodiment, the system may further include multiple pressure tanks 100 each having a smaller capacity than the storage tanks 101, 102, operated at a higher pressure than the storage tanks 101, 102, and storing liquefied hydrogen to be supplied to liquefied hydrogen demand sites 51, 52, liquefied hydrogen supply lines SL1, SL2 connecting the pressure tanks 100 to the liquefied hydrogen demand sites 51, 52 to transfer liquefied hydrogen from the pressure tanks 100 to the liquefied hydrogen demand sites 51, 52, and return lines RL1, RL2, RL3, RL4, RL5 through which boil-off gas is collected from the pressure tanks 100 and the liquefied hydrogen demand sites 51, 52.

The pressure tank 100 according to this embodiment may be operated at a pressure higher than the operating pressure (3 bar or less) of the storage tanks 101, 102. For example, the pressure tank 100 according to this embodiment may be operated at a pressure of 6 bar or more, or 10 bar or more.

Since the operating pressure of the pressure tank 100 is higher than the operating pressure of the storage tanks 101, 102, a liquefied hydrogen discharge line LL connecting the storage tanks 101, 102 to the pressure tank 100 may be provided with a supply pump 50 that pressurizes liquefied hydrogen in the storage tanks 101, 102 and delivers the pressurized liquefied hydrogen to the pressure tanks 100. That is, the supply pump 50 forces liquefied hydrogen to be transferred from the storage tanks 101, 102 to the pressure tank 100.

The supply pump 50 according to this embodiment is an optional component, which may be omitted and the arrangement height of the pressure tank 100 may be lower than the arrangement height of the storage tanks 101, 102. That is, liquefied hydrogen can be transferred from the storage tanks 101, 102 to the pressure tank 100 due to a height difference therebetween without requiring additional force from the supply pump 50.

According to this embodiment, prior to transferring liquefied hydrogen from the storage tank 102 to the pressure tank 100, the liquefied hydrogen discharge line LL connecting the storage tank 102 to the pressure tank 100 may be pre-cooled using liquefied hydrogen discharged from the storage tank 102.

When the supply pump 50 is provided to the liquefied hydrogen discharge line LL, the supply pump 50 may be pre-cooled along with the liquefied hydrogen discharge line LL, thereby preventing cavitation of the supply pump 50.

As a means for pre-cooling the liquefied hydrogen discharge line LL, the system may further include a liquefied hydrogen return line LL1 branched off upstream of the pressure tank 100 or a joint between the pressure tank 100 and the liquefied hydrogen discharge line LL, that is, a header, and joined upstream of the supply pump 50 or downstream of a joint between the storage tanks 101, 102 and the liquefied hydrogen discharge line LL, that is, a header, to allow liquefied hydrogen heated while pre-cooling the liquefied hydrogen discharge line LL to be recirculated upstream of the liquefied hydrogen discharge line LL therethrough.

In this embodiment, the inside of the pressure tank 100 is maintained at a pressure of 10 bar or more, and the liquefied hydrogen demand sites 51, 52 are operated at a pressure of less than 10 bar.

The internal pressure of the pressure tank 100 may be maintained by compressing boil-off gas discharged from the storage tanks 101, 102 and supplying the compressed boil-off gas to the pressure tank 100.

According to this embodiment, in order to maintain the internal pressure of the pressure tank 100 at the operating pressure, at least one storage tank 102 among the multiple storage tanks 101, 102 may be operated in the high-temperature mode and boil-off gas discharged from the high-temperature tank 102 may be supplied to the pressure tank 100 using the compressor 41.

Figure 2:
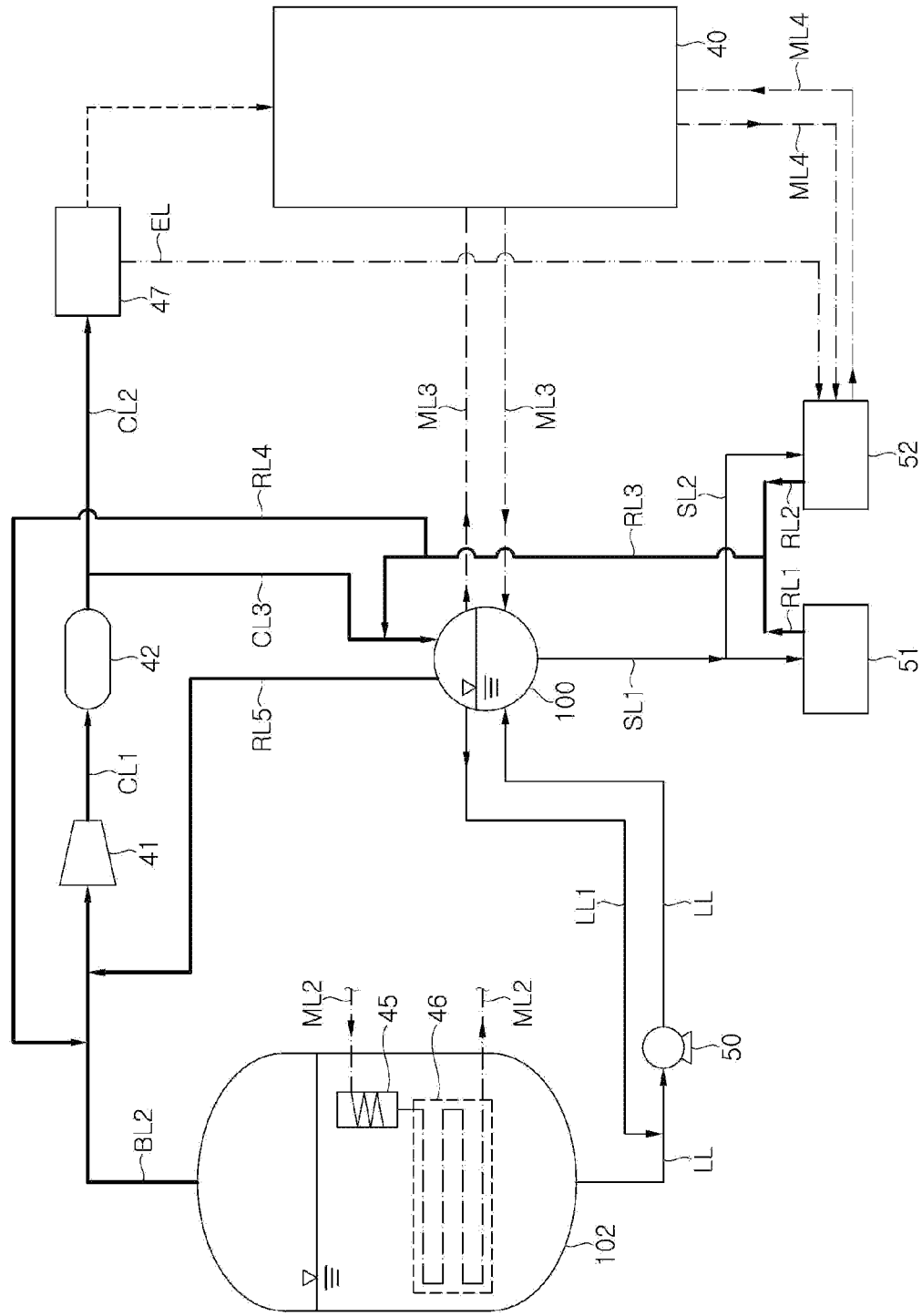
FIG. 2 is a schematic diagram of a system for controlling boil-off gas from liquefied hydrogen according to a second embodiment of the present invention.

Although only the connection between the high-temperature tank 102 and the pressure tank 100 is shown in FIG. 2 and supply of boil-off gas from the high-temperature tank 102 to the pressure tank 100 has been described above, it should be understood that the above description may be equally applicable to the low-temperature tank 101.

Among boil-off gas discharged from the high-temperature tank 102 and having been compressed to high pressure by the compressor 41, boil-off gas in excess of what is needed for the pressure tank 100 may be stored in the buffer tank 42, may be supplied to the energy conversion unit 47 to be used in producing electric power, or may be stored in the buffer tank 42 and then supplied to the energy conversion unit 47.

In addition, in order to prevent the pressure of the pressure tank 100 from becoming lower than the operating pressure, high-pressure boil-off gas stored in the buffer tank 42 may be preferentially supplied to the pressure tank 100.

In this embodiment, the compressor 41 may be a multistage compressor including a first compressor depressurizing the inside of the high-temperature tank 102 to a vacuum through discharge of boil-off gas from the high-temperature tank 102 and a second compressor compressing boil-off gas to a pressure required for the pressure tank 100. The first compressor and the second compressor may be connected in series or in parallel.

Unloading of liquefied hydrogen from the pressure tank 100 to the liquefied hydrogen demand sites 51, 52 may be performed through a process in which a first liquefied hydrogen supply line SL1 by the pressure of liquefied hydrogen transferred from the pressure tank 100 and a second liquefied hydrogen supply line SL2 by the pressure of liquefied hydrogen transferred from the storage tanks 101, 102 to the pressure tank 100 along the liquefied hydrogen discharge line LL due to a pressure difference or height difference between the storage tanks 101, 102 and the pressure tank 100 and the pressure of high-pressure boil-off gas transferred from the buffer tank 42 along a third boil-off gas distribution line CL3.

The third boil-off gas distribution line CL3 is a flow path of high-pressure boil-off gas, which connects the buffer tank 42 to the pressure tank 100, and serves to maintain the internal pressure of the pressure tank 100. Boil-off gas compressed to high pressure by the compressor 41 or boil-off gas compressed to high-pressure by the compressor 41 and having been stored in the buffer tank 42 is transferred to the pressure tank 100 through the third boil-off gas distribution line CL3.

In this embodiment, when the high-pressure boil-off gas transferred through the third boil-off gas distribution line CL3 alone is insufficient to maintain the internal pressure of the pressure tank 100, the internal pressure of the pressure tank 100 can be maintained by vaporizing liquefied hydrogen stored in the pressure tank 100.

As a means for maintaining the internal pressure of the pressure tank 100, the system may further include a third heat transfer medium line ML3 connecting the pressure tank 100 to the heat transfer medium circulation unit 40 and a fifth return line RL5 connecting the pressure tank 100 to a point upstream of the compressor 41.

A high-temperature heat transfer medium is transferred from the heat transfer medium circulation unit 40 to the pressure tank 100 through the third heat transfer medium line ML3, and a low-temperature heat transfer medium having recovered cold heat from liquefied hydrogen stored in the pressure tank 100 while vaporizing the liquefied hydrogen is returned to the heat transfer medium circulation unit 40 through the third heat transfer medium line ML3.

When boil-off gas is generated in the pressure tank 100 by circulation of the heat transfer medium along the third heat transfer medium line ML3, the internal pressure of the pressure tank 100 increases, thereby maintaining the operating pressure of the pressure tank 100. In addition, the operating pressure of the pressure tank 100 may be maintained by discharging boil-off gas from the pressure tank 100, transferring the discharged boil-off gas upstream of the compressor 41 through the fifth return line RL, compressing the transferred boil-off gas to high pressure using the compressor 41, and supplying the high-pressure boil-off gas to the pressure tank 100.

The third heat transfer medium line ML3 connecting the pressure tank 100 to the heat transfer medium circulation unit 40 and various devices including heat exchangers and valves which may be disposed in the third heat transfer medium line ML3 and at a joint between the third heat transfer medium line ML3 and the pressure tank 100 or the heat transfer medium circulation unit 40, that is, a header, may be housed in a cold box to be primarily insulated by vacuum. Here, the cold box may be provided with a hydrogen sensor to detect leakage of hydrogen.

In addition, an insulator may be disposed on an outer surface of the cold box to provide secondary insulation.

The liquefied hydrogen demand sites 51, 52 according to this embodiment may include at least one selected from a liquefied hydrogen storage station 51, such as a liquefied hydrogen terminal, as a first demand site and a vaporizer 52 vaporizing liquefied hydrogen and supplying the vaporized hydrogen to a gaseous hydrogen demand site, as a second demand site.

In addition, the liquefied hydrogen storage station 51 according to this embodiment may include not only an onshore terminal, but also a ship or a tractor trailer supplied with liquefied hydrogen at an onshore terminal.

The first demand site 51 may be supplied with liquefied hydrogen through the first liquefied hydrogen supply line SL1 connecting the pressure tank 100 to the first demand site 51, and the second demand site 52 may be supplied with liquefied hydrogen through the second liquefied hydrogen supply line SL2 connecting the pressure tank 100 to the second demand site 52.

Prior to transferring liquefied hydrogen to the liquefied hydrogen demand sites 51, 52, the liquefied hydrogen supply lines SL1, SL2 may be pre-cooled using liquefied hydrogen stored in the pressure tank 100 or the storage tank 102.

Boil-off gas generated during pre-cooling of the liquefied hydrogen supply lines SL1, SL2 may be returned to the pressure tank 100 through a third return line RL3 connected to the pressure tank 100, or may be returned to the compressor 41 through a fourth return line RL4 connected to the compressor 41.

Specifically, boil-off gas generated during pre-cooling of the first liquefied hydrogen supply line SL1 may be sent to the third return line RL3 and the fourth return line RL4 through a first return line RL1 and boil-off gas generated during pre-cooling of the second liquefied hydrogen supply line SL2 may be sent to the third return line RL3 and the fourth return line RL4 through a second return line RL2.

In addition, boil-off gas generated at the liquefied hydrogen demand sites 51, 52 during supply of liquefied hydrogen to the liquefied hydrogen demand sites 51, 52 and having a pressure exceeding the allowable pressure for the liquefied hydrogen demand sites 51, 52 may also be returned to the compressor 41 through the first to fourth return lines RL1 to RL4.

Boil-off gas sent upstream of the compressor 41 through the fourth return line RL4 and the fifth return line RL5 and having been compressed by the compressor 41 may be stored in the buffer tank 42, or may be returned to the pressure tank 100 to be used to maintain the internal pressure of the pressure tank 100.

In addition, boil-off gas returned from the liquefied hydrogen demand sites 51, 52 to the compressor 41 through the fourth return line RL4 and the fifth return line RL5 may be supplied to the energy conversion unit 47 through the second boil-off gas distribution line CL2 to be used in producing electric power.

As described above, the second demand site 52 according to this embodiment may be a vaporizer. Here, heat of vaporization generated upon vaporization of liquefied hydrogen by the vaporizer may be recovered through a fourth heat transfer medium line ML4 connecting the heat transfer medium circulation unit 40 to the second demand site 52.

A high-temperature heat transfer medium is supplied from the heat transfer medium circulation unit 40 to the vaporizer 52 through the fourth heat transfer medium line ML4, and a low-temperature heat transfer medium having recovered cold heat while vaporizing liquefied hydrogen in the vaporizer 52 is returned to the heat transfer medium circulation unit 40 through the fourth heat transfer medium line ML4.

In addition, waste heat generated upon production of electric power by the energy conversion unit 47 may be supplied to the vaporizer 52 through a waste heat supply line EL connecting the energy conversion unit 47 to the vaporizer 52 to be used as thermal energy for vaporizing liquefied hydrogen.

Waste heat transferred through the waste heat supply line EL may have a temperature of about 500° ° C. to 600° ° C.

In the system and method according to this embodiment, boil-off gas generated during unloading of liquefied hydrogen may be used to maintain the pressure tank 100 at a pressure required for delivery of liquefied hydrogen to the liquefied hydrogen demand sites. In addition, the liquefied hydrogen supply system and method according to this embodiment can efficiently maintain the pressure of the pressure tank 100 by utilizing cold heat and waste heat of liquefied hydrogen upon unloading of the liquefied hydrogen.

In the second embodiment, it has been described that liquefied hydrogen is supplied from the storage tanks 101, 102 to the pressure tank 100 and then is unloaded from the pressure tank 100 to the liquefied hydrogen demand sites 51, 52. However, it should be understood that the present invention is not limited thereto and this embodiment may be equally applicable when liquefied hydrogen is unloaded directly from an onshore liquefied hydrogen receiving station to the pressure tank 100 while liquefied hydrogen is unloaded from the pressure tank 100 to the liquefied hydrogen demand sites 51, 52. Here, a storage facility of the onshore liquefied hydrogen receiving station may include the storage tanks 101, 102 according to the embodiment.

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention.

LIST OF REFERENCE NUMERALS

100: Pressure tank
101: Low-temperature tank
102: High-temperature tank
40: Heat transfer medium circulation unit
41: Compressor
42: Buffer tank
47: Energy conversion unit
43, 45: Densification unit
44, 46: Temperature maintenance unit
51, 52: Liquefied hydrogen demand site
BL1, BL2: Boil-off gas supply line
CL1, CL2, CL3: Boil-off gas distribution line
ML1, ML2, ML3, ML4, ML5: Heat transfer medium circulation line
RL1, RL2, RL3, RL4, RL5: Return line
SL1, SL2: Liquefied hydrogen supply line
LL: Liquefied hydrogen discharge line
LL1: Liquefied hydrogen return line
EL: Waste heat supply line

The invention claimed is:

1. A method for controlling boil-off gas from liquefied hydrogen, comprising:
    operating a boil-off gas controlling system that comprises:
        at least two storage tanks storing liquefied hydrogen, and
        an internal temperature maintenance device disposed inside each of the at least two storage tanks and configured to cause each storage tank to be operated in a high-temperature mode or in a low-temperature mode to induce or suppress vaporization reaction of the stored liquefied hydrogen,
    wherein the at least two storage tanks comprise a first storage tank,
    wherein operating the boil-off gas controlling system comprises operating the first storage tank in the high-temperature mode or the low-temperature mode,
    wherein operating the first storage tank in the low-temperature mode comprises maintaining at least a portion of the liquefied hydrogen stored in the first storage tank at a first temperature being a densification temperature to suppress an ortho-para conversion reaction of hydrogen, and
    wherein operating the first storage tank in the high-temperature mode comprises maintaining at least a portion of the liquefied hydrogen stored in the first storage tank at a second temperature being a temperature exceeding a triple point of the liquefied hydrogen through recovery of cold heat from the liquefied hydrogen stored in the first storage tank.

2. The method according to claim 1, wherein, in maintaining at least a portion of the liquefied hydrogen stored in the first storage tank at the second temperature, boil-off gas is generated, and operating the first storage tank in the high-temperature mode further comprises: interrupting successive evaporation by depressurizing an inside of the first storage tank to a vacuum; and discharging the generated boil-off gas from the first storage tank such that the generated boil-off gas is used to produce electric power.

3. The method according to claim 1, wherein the at least two storage tanks comprises a second storage tank, and wherein the cold heat recovered from the liquefied hydrogen in the high-temperature mode is used to maintain at least a portion of the liquefied hydrogen stored in the second storage tank at the first temperature.

4. The method according to claim 1, wherein maintaining at least a portion of the liquefied hydrogen stored in the first storage tank at the first temperature comprises: solidifying at least a portion of the liquefied hydrogen stored in the first storage tank operated in the low-temperature mode, such that the liquefied hydrogen stored in the first storage tank operated in the low-temperature mode is present in a solid state and a liquid state.

5. A system for controlling boil-off gas from liquefied hydrogen, comprising:
    at least two storage tanks storing liquefied hydrogen,
    a densification unit disposed inside each of the at least two storage tanks and configured to maintain the liquefied hydrogen stored in each storage tank at a first temperature; and
    a temperature maintenance unit disposed inside each of the at least two storage tanks and configured to maintain the liquefied hydrogen stored in each storage tank at a second temperature such that the densification unit and the temperature maintenance unit are configured to suppress or induce vaporization reaction of the stored liquefied hydrogen, the at least two storage tanks comprising:
- a low-temperature tank in which at least a portion of the liquefied hydrogen stored therein is maintained at the first temperature being a densification temperature by the densification unit to suppress an ortho-para conversion reaction of hydrogen; and
- a high-temperature tank in which at least a portion of the liquefied hydrogen stored therein is maintained at the second temperature being a temperature exceeding a triple point of the liquefied hydrogen by the temperature maintenance unit.

6. The system according to claim 5, further comprising:
a compressor configured to discharge boil-off gas from the high-temperature tank of the at least two storage tanks and depressurize an inside of the high-temperature tank to a vacuum;
a buffer tank configured to store the boil-off gas compressed by the compressor; and
an energy conversion unit configured to produce electric power using the boil-off gas stored in the buffer tank.

7. The system according to claim 6, further comprising:
a heat transfer medium circulation unit configured to receive a low-temperature heat transfer medium having recovered cold heat from the liquefied hydrogen in the temperature maintenance unit disposed inside the high-temperature tank and supply the low-temperature heat transfer medium to the temperature maintenance unit disposed in the low-temperature tank,
wherein the heat transfer medium circulation unit is driven by the electric power produced by the energy conversion unit.

8. The system according to claim 5, further comprising:
a heat transfer medium circulation unit configured to supply a low-temperature heat transfer medium to the temperature maintenance unit of each of the at least two storage tanks,
wherein the densification unit of the low-temperature tank is configured to solidify at least a portion of the liquefied hydrogen stored in the low-temperature tank by primarily recovering cold heat from the low-temperature heat transfer medium supplied to the temperature maintenance unit of the high-temperature tank.

9. The method according to claim 1, wherein the internal temperature maintenance device comprises:
a densification unit disposed inside each storage tank and configured to maintain the liquefied hydrogen stored in each storage tank at the first temperature; and
a temperature maintenance unit disposed inside each storage tank and configured to maintain the liquefied hydrogen stored in each storage tank at the second temperature such that the densification unit and the temperature maintenance unit are configured to suppress or induce the vaporization reaction of stored liquefied hydrogen.

* * * * *